(12) United States Patent
Singh

(10) Patent No.: US 9,740,643 B2
(45) Date of Patent: Aug. 22, 2017

(54) SYSTEMS AND METHODS FOR RECOVERING HIGHER SPEED COMMUNICATION BETWEEN DEVICES

(71) Applicant: APPLE INC., Cupertino, CA (US)

(72) Inventor: Gurinder Singh, San Jose, CA (US)

(73) Assignee: APPLE INC., Cupertino, CA (US)

( * ) Notice: Subject to any disclaimer, the term of this patent is extended or adjusted under 35 U.S.C. 154(b) by 1089 days.

(21) Appl. No.: 13/923,151

(22) Filed: Jun. 20, 2013

(65) Prior Publication Data

US 2014/0379944 A1  Dec. 25, 2014

(51) Int. Cl.
  *G06F 13/20*  (2006.01)
  *G06F 13/40*  (2006.01)
(52) U.S. Cl.
  CPC .......... *G06F 13/20* (2013.01); *G06F 13/4086* (2013.01)
(58) Field of Classification Search
  None
  See application file for complete search history.

(56) References Cited

U.S. PATENT DOCUMENTS

| | | | |
|---|---|---|---|
| 5,265,151 A * | 11/1993 | Goldstein | G01R 29/26 375/222 |
| 6,418,500 B1 | 7/2002 | Gai et al. | |
| 6,542,946 B1 | 4/2003 | Wooten | |
| 6,647,058 B1 * | 11/2003 | Bremer | H04B 3/46 375/222 |
| 6,757,327 B1 | 6/2004 | Fiedler | |
| 7,173,450 B2 | 2/2007 | Atkinson | |
| 7,218,136 B2 | 5/2007 | Kasahara | |
| 7,474,118 B2 | 1/2009 | Kasahara | |
| 7,500,027 B2 | 3/2009 | Wu | |

(Continued)

FOREIGN PATENT DOCUMENTS

| | | |
|---|---|---|
| CN | 101004729 A | 7/2007 |
| CN | 202168062 U | 3/2012 |

(Continued)

OTHER PUBLICATIONS

Taiwanese Office Action for Taiwanese Patent Application No. 103119110 dated May 19, 2015; 3 pgs.

(Continued)

*Primary Examiner* — Ilwoo Park
(74) *Attorney, Agent, or Firm* — Fletcher Yoder PC

(57) ABSTRACT

A method of operating a device is disclosed. The method includes attempting communication between the device and a separate connecting device. The attempt utilizes a first resistance and determines whether communication is able to occur at a higher speed mode or lower speed mode. If communication is able to occur at the higher speed mode, using the first resistance, communication continues at the higher speed mode. If communication is not able to occur at the higher speed mode, another attempt through a second resistance is tried. The method again includes determining whether communication is able to occur at the higher speed mode through the second resistance. If communication is able to occur at the higher speed mode through the second resistance, communication continues at the higher speed mode. If communication is not able to occur at the higher speed mode, communication stays at the lower speed mode.

18 Claims, 6 Drawing Sheets

(56) References Cited

U.S. PATENT DOCUMENTS

| | | | |
|---|---|---|---|
| 7,671,630 B2 | 3/2010 | Howe et al. | |
| 8,738,953 B2* | 5/2014 | Wang | G06F 1/3203 713/320 |
| 8,811,898 B2 | 8/2014 | Sekita et al. | |
| 8,924,621 B2 | 12/2014 | Jadus | |
| 2001/0017846 A1 | 8/2001 | Wu | |
| 2004/0177204 A1* | 9/2004 | Campbell | G06F 13/4072 710/305 |
| 2005/0033996 A1 | 2/2005 | Fong et al. | |
| 2005/0264316 A1 | 12/2005 | Atkinson | |
| 2007/0120579 A1 | 5/2007 | Komatsu et al. | |
| 2007/0241769 A1 | 10/2007 | Song et al. | |
| 2010/0082846 A1* | 4/2010 | Kim | G06F 13/426 710/14 |
| 2011/0161531 A1* | 6/2011 | Katayama | G06F 3/1211 710/14 |
| 2011/0231685 A1 | 9/2011 | Huang et al. | |
| 2013/0012357 A1 | 1/2013 | Wang | |
| 2013/0335224 A1 | 12/2013 | Tang | |
| 2014/0237282 A1 | 8/2014 | Park et al. | |

FOREIGN PATENT DOCUMENTS

| | | |
|---|---|---|
| CN | 102591826 A | 7/2012 |
| JP | 2004-171558 A | 6/2004 |
| JP | 2005340945 A | 12/2005 |
| JP | 2007-172160 A | 7/2007 |
| JP | 2007-173766 A | 7/2007 |
| JP | 2007-174618 A | 7/2007 |
| JP | 2008-501197 A | 1/2008 |
| JP | 2008-152533 A | 7/2008 |
| JP | 2010-134545 A | 6/2010 |
| JP | 2011-118674 A | 6/2011 |
| KR | 10-2013-0031714 A | 3/2013 |
| TW | M443977 U1 | 12/2012 |
| TW | M444186 U1 | 1/2013 |
| WO | 00/51007 A1 | 8/2000 |

OTHER PUBLICATIONS

International Search Report and Written Opinion for PCT Application No. PCT/US2014/037348 dated Sep. 3, 2014; 12 pgs.
Korean WIPS Search Report for Korean Application No. 10-2015-0733357 dated Dec. 17, 2015; 14 pgs.
Japanese Office Action for Japanese Application No. 2016-515347 dated Jan. 10, 2017, 4 pgs.
Chinese Office Action for Chinese Application No. 201480030242.3 dated May 2, 2017.

* cited by examiner

SYSTEMS AND METHODS FOR RECOVERING HIGHER SPEED COMMUNICATION BETWEEN DEVICES

BACKGROUND

The present disclosure relates generally to communication between electronic devices and, more particularly, to variable resistance termination paths that switch in response to changes in a communication speed to maintain or recover higher-speed communication.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Electronic communication between devices is common in such devices as televisions, DVD players and other video display equipment, computers, phones, and others. Computers in particular may communicate with several devices at once. For example, keyboards, computer mice, cameras, speakers, microphones, hard drives, flash drives, and other devices may be connected to a single computer. Various protocols and communication forms, such as Universal Serial Bus, exist to connect host devices with these other devices. Many forms allow devices to be serially connected such that more than one device is routed through one input/output port on the computer or other host device. In these and other circumstances, the temperature of the host device may increase, which can change the characteristics of the electronic components of the host device. For example, the resistances of the internal connections within the host device may increase.

Conventionally, host devices may suffer a drop in the speed of communication with the other device when a disconnect trigger event occurs. A disconnect event may occur, for example, when the host device experiences an increase in resistance. The resistance may be increased by a rise in temperature of the host device, or by additional devices being connected to the host device. For example, a USB host device may trigger a Hi-Speed disconnect which causes the host device to communicate at Full-Speed instead of Hi-Speed. A drop in speed of this type may be inconvenient for a user and may increase the time it takes for the user to finish device-related tasks.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

Embodiments of the present disclosure relate to systems, methods, and devices for reducing or eliminating a drop in signal speed resulting from changes in electronic characteristics during operation of the host device. In a particular example, a USB host device may suffer a Hi-Speed disconnect which would be addressed in the embodiments described below. In one embodiment, a device contains a number of variable series resistance paths from which a device may select. In another embodiment, the device may select between a number of power levels.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but may nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

As mentioned above, varying electronic characteristics during operation of a host device can produce a reduction in the communication speed when the host device communicates with a connecting device. This reduction in speed may affect performance of either device and thus it is desirable to limit this reduction. The reduction in speed may be repaired and/or remedied by detecting when communication has dropped to a lower speed, assuming that the reduction has occurred due to some increase in resistance, and reducing the resistance supplied by one of the variable series termination paths. If the first change to a second variable series termination path does not result in higher speed communication, a subsequent additional change to a lower supplied resistance may occur. Each change may occur without testing how much the resistance has actually changed.

Figure 1:
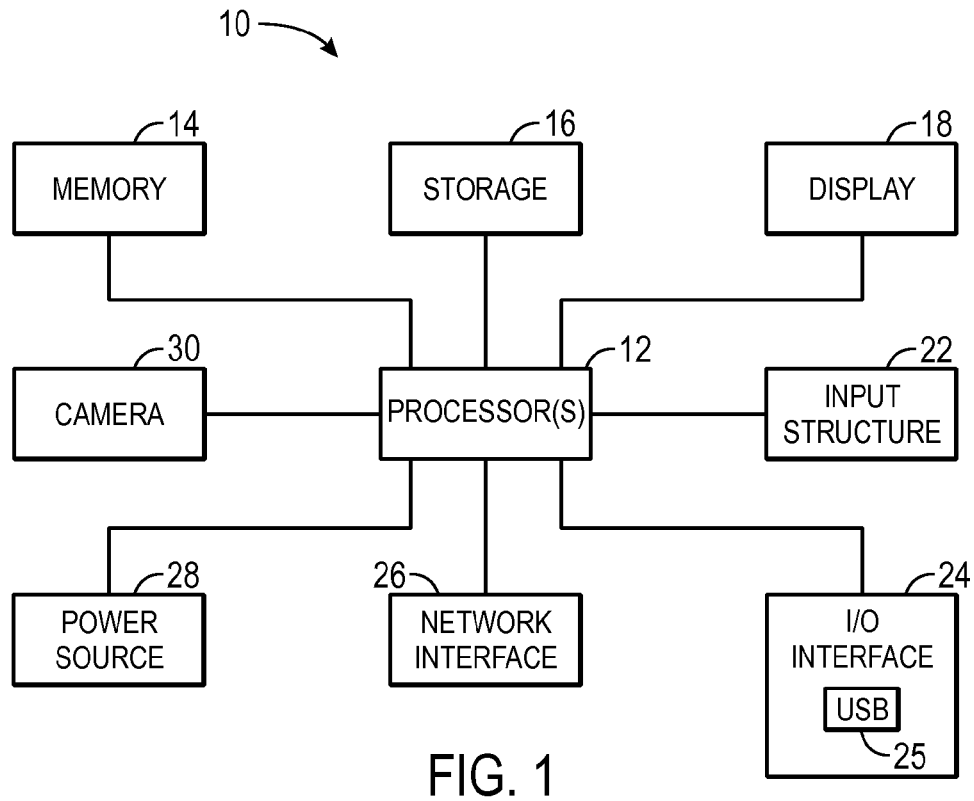
FIG. 1 is a block diagram of an electronic device with a host communication controller, in accordance with an embodiment.
Figure 2:
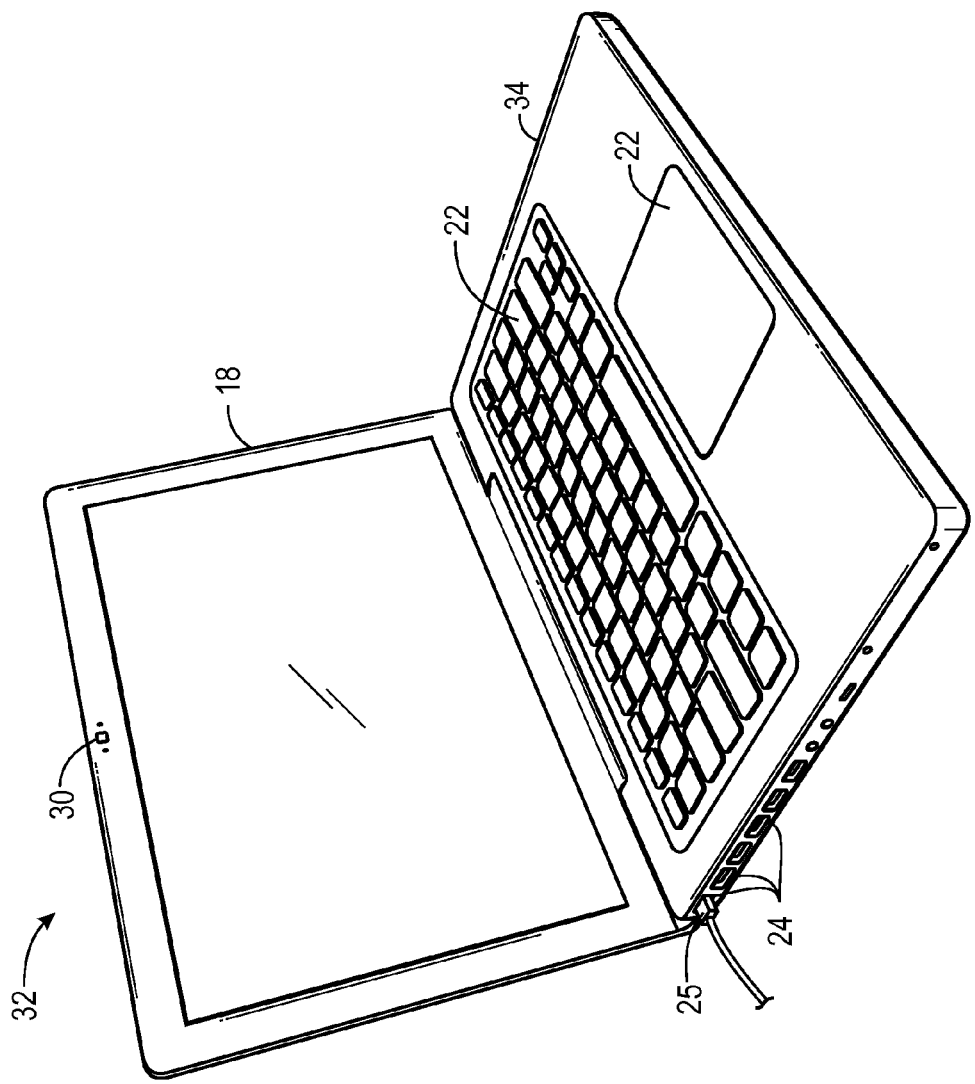
FIG. 2 is a perspective view of a notebook computer representing an embodiment of the electronic device of FIG. 1.
Figure 2:
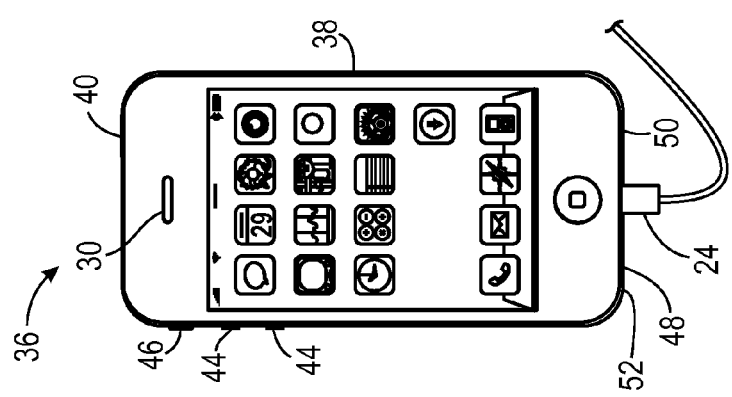

With the foregoing in mind, many suitable electronic devices may employ variable termination paths to reduce or eliminate a reduction in communication speed. For example, FIG. 1 is a block diagram depicting various components that may be present in an electronic device suitable for use with such variable termination paths. FIG. 2 illustrates a perspective view of a suitable electronic host device connected to the connecting device. The devices may be, as illustrated, a notebook computer (i.e., the host device) and a handheld electronic device (i.e., the connecting device).

Turning first to FIG. 1, an electronic device 10 may represent either the host device or the connecting device mentioned above. The electronic device 10, according to an embodiment of the present disclosure may include, among other things, one or more processor(s) 12, memory 14, nonvolatile storage 16, a display 18, input structures 22, an input/output (I/O) interface 24, a Universal Serial Bus (USB) port 25 included as one of the ports in the I/O interface 24, network interfaces 26, a power source 28, and/or a camera 30. The various functional blocks shown in FIG. 1 may include hardware elements (including circuitry), software elements (including computer code stored on a computer-readable medium) or a combination of both hardware and software elements. It should be noted that FIG. 1 is merely one example of a particular implementation and is intended to illustrate the types of components that may be present in the electronic device 10.

By way of example, the electronic device 10 may represent a block diagram of the notebook computer depicted in FIG. 2, or similar devices. It should be noted that the processor(s) 12 and/or other data processing circuitry may be generally referred to herein as "data processing circuitry." This data processing circuitry may be embodied wholly or in part as software, firmware, hardware, or any combination thereof. Furthermore, the data processing circuitry may be a single contained processing module or may be incorporated wholly or partially within any of the other elements within the electronic device 10. As presented herein, the data processing circuitry may control the selection of the variable resistance termination paths connected with the I/O interface 24.

In the electronic device 10 of FIG. 1, the processor(s) 12 and/or other data processing circuitry may be operably coupled with the memory 14 and the nonvolatile memory 16 to execute instructions. Such programs or instructions executed by the processor(s) 12 may be stored in any suitable article of manufacture that includes one or more tangible, computer-readable media at least collectively storing the instructions or routines, such as the memory 14 and the nonvolatile storage 16. The memory 14 and the nonvolatile storage 16 may include any suitable articles of manufacture for storing data and executable instructions, such as random-access memory, read-only memory, rewritable flash memory, hard drives, and optical discs. Also, programs (e.g., an operating system) encoded on such a computer program product may also include instructions that may be executed by the processor(s) 12.

The display 18 may be a touch-screen liquid crystal display (LCD), for example, which may enable users to interact with a user interface of the electronic device 10. In some embodiments, the electronic display 18 may be a MultiTouch™ display that can detect multiple touches at once. The input structures 22 of the electronic device 10 may enable a user to interact with the electronic device 10 (e.g., pressing a button to increase or decrease a volume level). The network interfaces 26 may enable the electronic device 10 to interface with various other electronic devices and may include, for example, interfaces for a personal area network (PAN), such as a Bluetooth network, for a local area network (LAN), such as an 802.11x Wi-Fi network, and/or for a wide area network (WAN), such as a 3G or 4G cellular network. The power source 28 of the electronic device 10 may be any suitable source of power, such as a rechargeable lithium polymer (Li-poly) battery and/or an alternating current (AC) power converter. The camera(s) 30 may capture images.

The I/O interface 24 may enable also electronic device 10 to interface with various other electronic devices, as may the network interfaces 26. The I/O interface 24 may include the USB connector 25, a mouse connector, a keyboard connector, a FireWire™ connector, a serial port connector, audio jacks, proprietary connectors, or other connectors.

The electronic device 10 may take the form of a computer or other type of electronic device. Such computers may include computers that are generally portable (such as laptop, notebook, and tablet computers) as well as computers that are generally used in one place (such as conventional desktop computers, workstations and/or servers). In certain embodiments, the electronic device 10 in the form of a computer may be a model of a MacBook®, MacBook® Pro, MacBook Air®, iMac®, Mac® mini, or Mac Pro® available from Apple Inc. By way of example, the electronic device 10, taking the form of a notebook computer 32, is illustrated in FIG. 2 in accordance with one embodiment of the present disclosure. The depicted computer 32 may include a housing 34, a display 18, input structures 22, and ports of an I/O interface 24. In one embodiment, the input structures 22 (such as a keyboard and/or touchpad) may be used to interact with the computer 32, such as to start, control, or operate a GUI or applications running on computer 32. A camera 30 may obtain video or still images.

FIG. 2 depicts a front view of a handheld device 36 connected to the notebook computer 32 through the I/O interface 24. The handheld device 36 represents one embodiment of a device that may be a connecting device for the notebook computer 32. In other embodiments, the handheld device 36 may be a host device for a different connecting device. The handheld device 36 may represent, for example, a portable phone, a media player, a personal data organizer, a handheld game platform, or any combination of such devices. By way of example, the handheld device 36 may be a model of an iPod® or iPhone® available from Apple Inc. of Cupertino, Calif. In other embodiments, the handheld device 36 may be a tablet-sized embodiment of the electronic device 10, which may be, for example, a model of an iPad® available from Apple Inc.

The handheld device 36 may include an enclosure 38 to protect interior components from physical damage and to shield them from electromagnetic interference. The enclosure 38 may surround the display 18. The I/O interface 24 may open through the enclosure 38 and may include, for example, a proprietary I/O port from Apple Inc. to connect to external devices. The I/O interface 24 may be tuned to employ variable resistance paths to reduce or eliminate speed reduction in communication with a host device or a connecting device.

User input structures 40, 42, 44, and 46, in combination with the display 18, may allow a user to control the handheld device 36. For example, the input structure 40 may activate or deactivate the handheld device 36, the input structure 42 may navigate a user interface to a home screen, a user-configurable application screen, and/or activate a voice-recognition feature of the handheld device 36, the input structures 44 may provide volume control, and the input structure 46 may toggle between vibrate and ring modes. A microphone 48 may obtain a user's voice for various voice-related features, and a speaker 50 may enable audio playback and/or certain phone capabilities. A headphone input 52 may provide a connection to external speakers and/or headphones. A front-facing camera 30 may capture still images or video.

Figure 3:
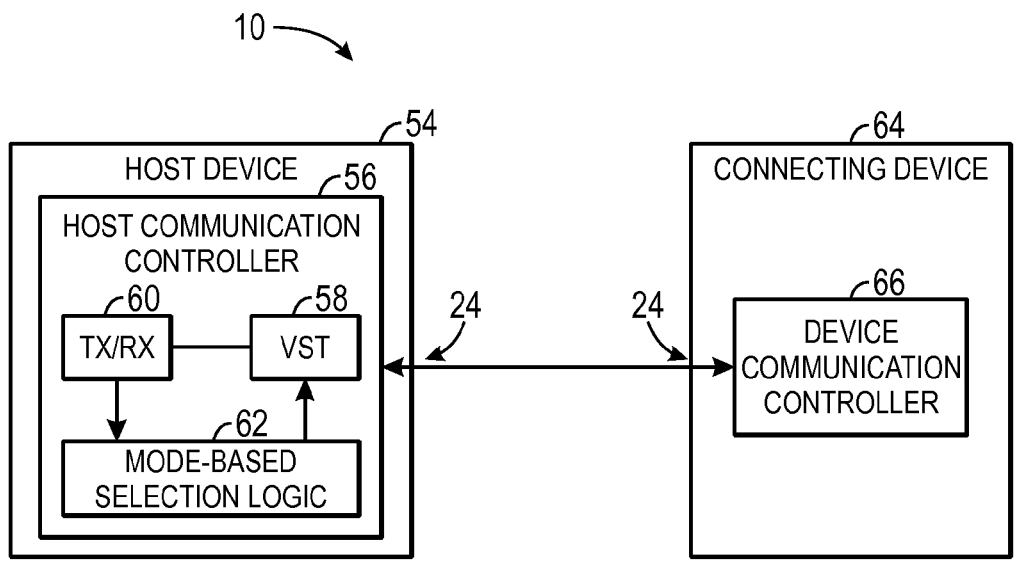
FIG. 3 is a block diagram of an electronic host device of FIG. 1 in communication with a connecting device, in accordance with an embodiment.

In the example of FIG. 3, the electronic device 10 may include the functionality of a host device 54. The host device 54 includes a host communication controller 56. The host communication controller 56 includes variable series termination paths 58 and transmit-receive circuitry 60 as well as mode-based selection logic 62. These components (58, 60, 62) cooperate to communicate a signal over a communication path through the I/O interface 24 to a connecting device 64. The connecting device 64 may also communicate through an I/O interface 24, as illustrated. The connecting device 64 includes a device communication controller 66 that reads and responds to incoming signals from the host device 54.

The host device 54 may be able to communicate with the connecting device 64 at one of several communication speeds. The communication speeds may vary, for example, on the data transfer rate of the transmission, voltage, current, or on some other parameter. USB speeds, for example, are distinguished primarily based on the data transfer rates. USB "Low Speed" is used to designate transfer across a USB cable at 1.5 Mbit/s. USB "Full Speed" is used to designate transfer across a USB cable at 12 Mbit/s and USB "Hi-Speed" is used to designate transfer across a USB cable at 280 Mbit/s. The host communication controller 56 may determine the communication speed with which to communicate with the connecting device 64 based on a number of factors. As described above, one limiting factor that the host device 54 may encounter when communicating with the connecting device 64 is rising temperatures and increased resistances in the internal components of the host device 10. The increase in resistance may trigger a disconnect, where the communication speed switches from a higher speed to a lower speed. For example, in the context of a USB connection, the disconnect may cause the signal to switch from Hi-Speed to Full Speed.

The host communication controller 56 contains variable series termination paths 58 in line with the communication path to compensate for the increased resistance elsewhere in the circuitry of the host device 10. The variable series termination paths 58 contain a number of resistors with a hierarchy of resistances. Any suitable number of resistors may be contained within the variable series termination paths 58. The variable series termination paths 58 are able to adjust the resistance supplied by the host communication controller 56 to the circuit communicating with the connecting device 64 by selecting one or more resistors with a higher or a lower resistance. The host communication controller 56 selects one or more resistors through a method described with regard to FIG. 4 below. When the resistance is selected, the host communication controller 56 uses the mode-based selection logic 62 and the transmit-receive controller 60 to communicate with the connecting device at the appropriate speed. The mode-based selection logic 62 responds to the communication mode at which the host communication controller 56 is currently communicating. When the host communication controller 56 communicates at one speed mode (e.g., a higher speed) the logic 62 may respond in one way, while communication at a different speed mode (e.g., a lower speed) may cause the logic 62 to respond differently. Possible logic responses for the mode-based logic 62 are outlined below. The transmit-receive controller 60 controls the transmission and reception of the signals communicated with the connecting device 64.

Figure 4:
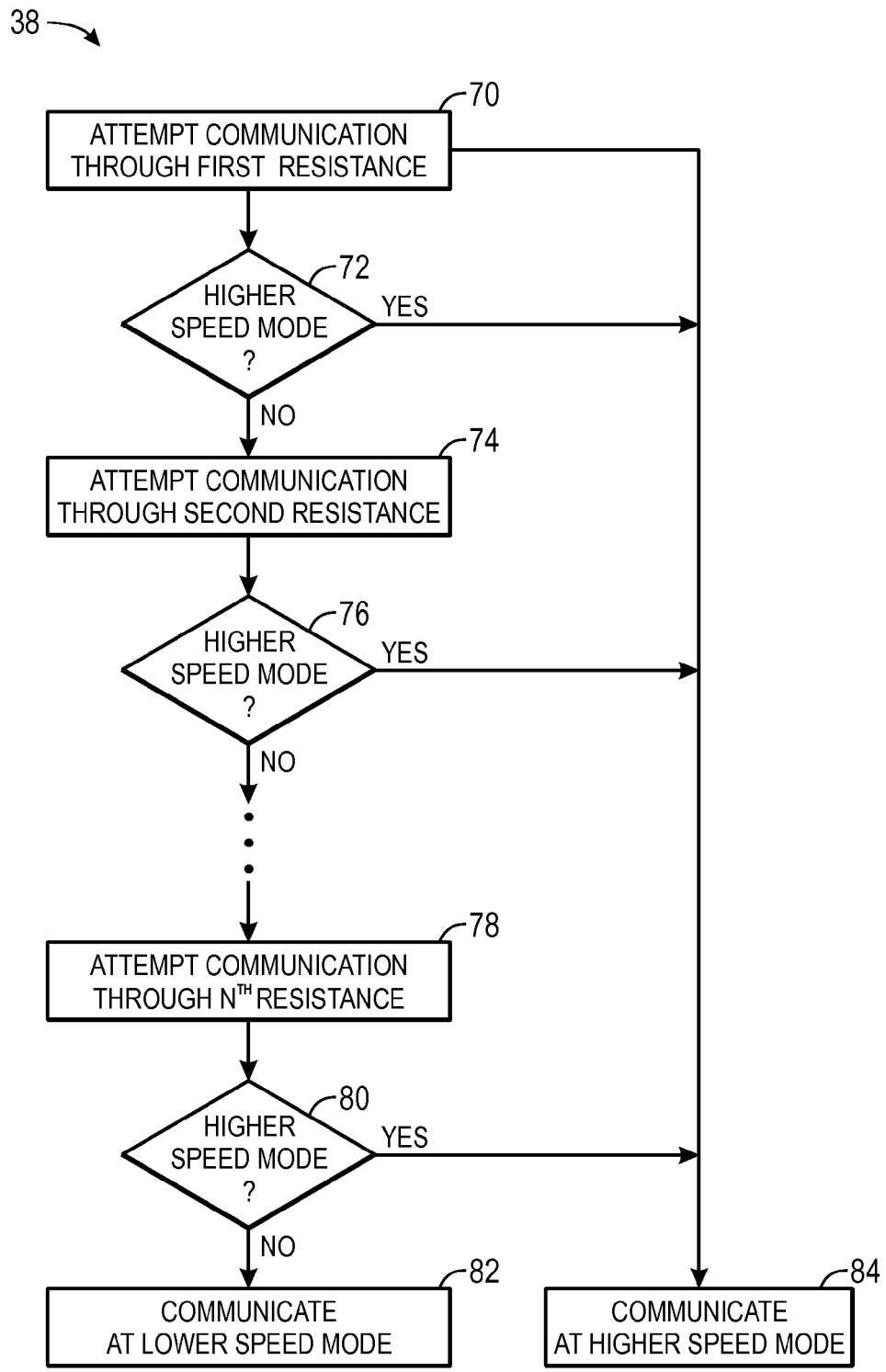
FIG. 4 is a flow chart of a method of communication by a host device with a connecting device, in accordance with an embodiment.

With the foregoing in mind, FIG. 4 describes how the host communication controller 56 remedies a disconnect situation and manages the communication speed of the connection between the host device 54 and the connecting device 64. Namely, FIG. 4 describes a method 68 that may be used to reduce or eliminate speed reduction in communication due to changes in resistance. The method 68 repetitiously lowers a supplied resistance (i.e., from the variable series termination paths 58) and queries whether communication is able to occur at a higher speed. The method continues until communication occurs at the higher speed, or there are no lower resistances to choose. The method 68 begins at block 70, where the host communication controller 56 attempts to communicate with the connecting device 64 through a first resistance of the variable series termination paths 58. The resistance may be selected, for example, based on a standard and/or default resistance for the communication speed (e.g., 45 Ohms).

At block 72, the host communication controller 56 detects whether or not the transmit-receive controller 60 was able to communicate with the connecting device 64 at a higher-speed mode. The communication mode is conveyed to the mode-based selection logic 62. If the mode-based logic 62 receives a negative signal, indicating communication at a mode other than the higher-speed mode, then at block 74 the host communication controller 56 again attempts communication, this time though a second resistance. In some embodiments this resistance will be lower than the first resistance. In other embodiments, a different resistor or combination of resistors may be chosen based on the accuracy of the tolerance levels (e.g., a 60 Ohms±20% resistance may be changed to a 60 Ohms±10% resistance).

After the second attempt, at block 76 the host communication controller 56 again detects the communication mode as explained with respect to block 72. If the communication does not occur in a higher speed mode, then the host communication controller 56 may continue to query the connection device through any number of additional resistances. The additional resistances may be arranged sequentially according to their respective resistance values. Thus, each subsequent resistance that the host communication controller 56 attempts to communicate through may be lower than the previously attempted resistance. The resistances may be lower by an amount of 20 Ohms, 10 Ohms, 5 Ohms, 2 Ohms, or some other amount, or may vary by an inconstant amount (e.g., lowering the resistance by 20 Ohms a first time and then 10 Ohms the next time). Varying the resistance by a small amount (e.g., 5 Ohms or less) may prevent overshooting of the desired resistance (e.g., if overheating has raised the resistance only 3 Ohms, a variable series termination path should be chosen that lowers the resistance about 3 Ohms). At block 78, the host communication controller 56 attempts communication through the nth resistance. In this embodiment, the nth resistance represents the last of all the resistances possible to the host communication controller 56. In other embodiments, the nth resistance in block 78 may represent the last resistance of a subsection of resistances available to the host communication controller 56. If the nth resistance does not yield a higher speed mode, at block 80, then the host communication controller 56 will communicate with the connecting device 64 at a lower speed mode.

In some embodiments, the host communication controller 56 may wait until the end of all queries before communicating in the lower speed mode. In other embodiments, however, the host communication controller 56 may communicate at the lower speed mode while continuing to query the connection device 64. Additionally, as shown at block 84, if at any step during the inquiry process the host communication controller 56 communicates with the connecting device 64 at the higher speed, then all subsequent communication will take place at the higher speed and the host communication controller 56 will cease communication at the lower speed mode.

Figure 5:
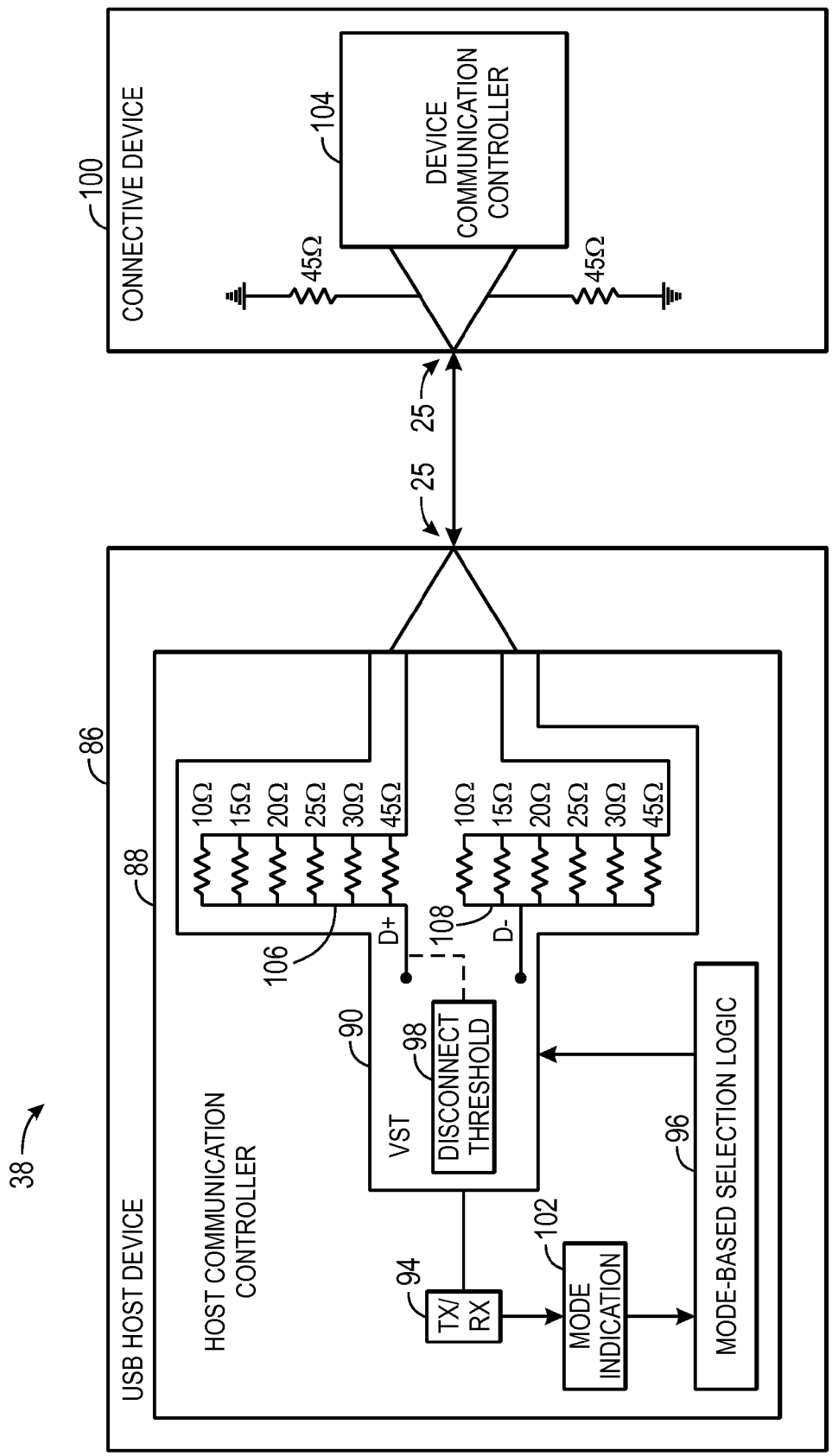
FIG. 5 is a block diagram of an embodiment of a host device that employs a Universal Serial Bus connection with a connecting device, in accordance with an embodiment.

A USB-specific embodiment of the host device 10 is illustrated in FIG. 5. A USB host device 86 includes a USB host communication controller 88, which includes similar components, such as variable series termination paths 90, a transmit-receive controller 92, and mode-based selection logic 96. In the USB version of the variable series termination paths 90, a default resistance of 45 Ohms may be used, as this is the standard resistance for USB devices and cables. Thus, when the USB host device 86 has just booted up, for example, and is still at room temperature, the host communication controller 88 may use the 45 Ohm resistor. As the USB host device 86 heats up due to data processing or other heat transfer, the increased resistance that results may cause voltage to exceed a disconnect threshold 98. The disconnect threshold 98 is a voltage level function that triggers a disconnect event within the USB host device 86. The voltage level function of the disconnect threshold 98 that varies as the per-channel resistance varies with tuning resistors. The disconnect event may cause the USB host device 86 to switch from communicating with a connecting device 100 at Hi-Speed to communicating with the connecting device 100 at Full Speed. As this is undesirable, the host communication controller 88 includes the ability to detect when the mode has changed. The transmit-receive controller 94 outputs a mode indication 102 that may trigger the mode-based selection logic 96 to switch to a different resistance among the variable series termination paths 90.

Figure 6:
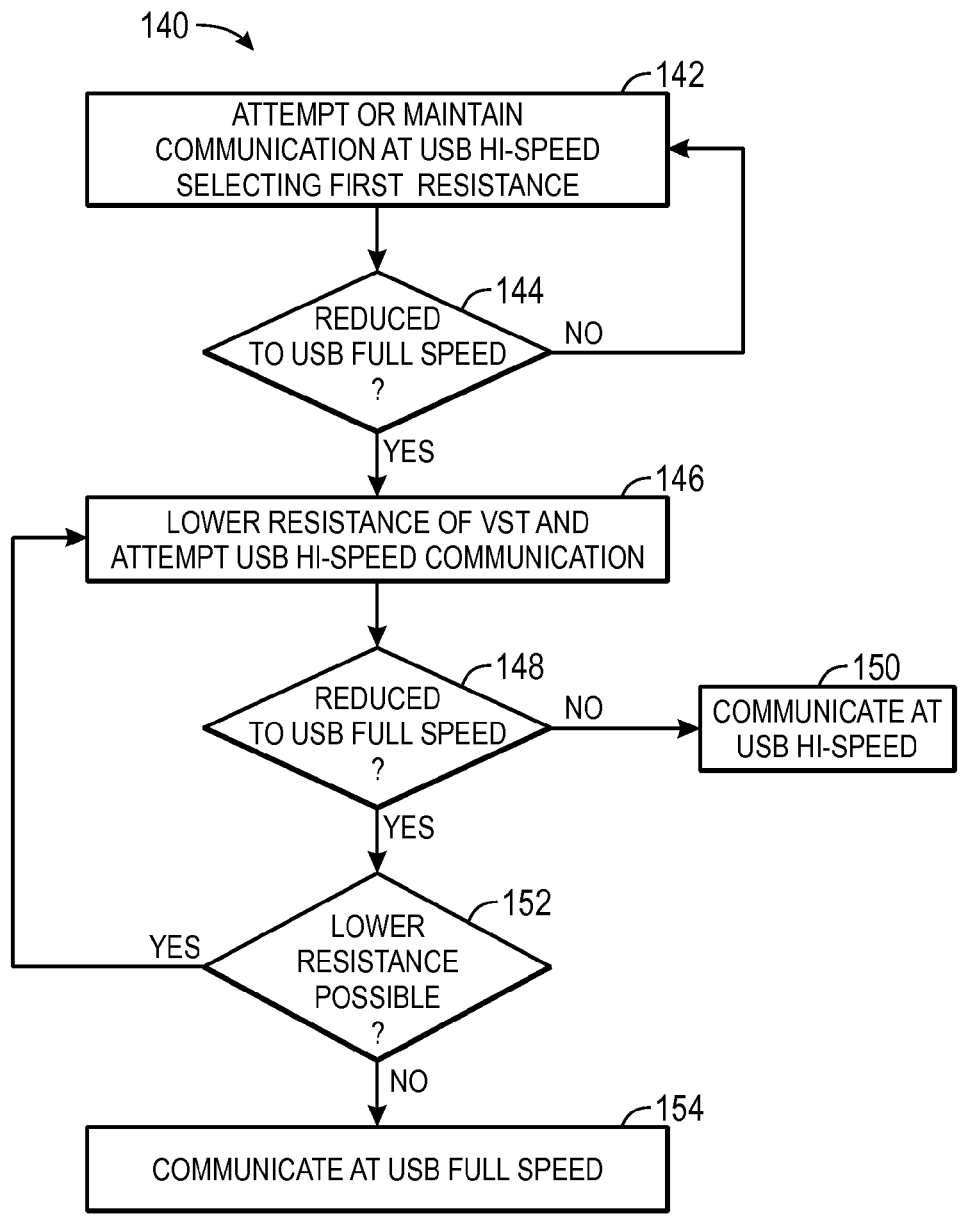
FIG. 6 is a flow chart of a method of communication by a USB host device with a connecting device, in accordance with an embodiment.

Switching between resistances with the variable series termination paths 90 may follow a method 140 outlined in the flowchart of FIG. 6. The host communication controller 88 may, at block 142, instruct the mode-based selection logic 96 to attempt or maintain communication with the connecting device 100 at USB Hi-Speed while selecting a first resistance. For example, the resistance may be provided by the 45 Ohms resistance path within the variable series termination paths 90. Next, at block 144 the host communication controller 88, or any other USB host device controller, detects whether communication with the connecting device 100 has been reduced to USB Full Speed.

The host device 86, or the connection device 100 may detect communication speed based on feedback received either from a device communication controller 104 within the connection device 100, or from the transmit-receive controller 94 within the host device 86. In the unique instance that the host device 86 is only sending information, the signal is received by a device communication controller 104 which may be configured to detect the speed at which information is coming from the host device 86. The device communication controller 104 then sends a signal back to the host device 86, conveying the communication speed. If the communication involves both devices sending information, the transmit-receive controller 94 may be configured to detect the speed at which information is being communicated. The detection of the communication speed may be designed to occur while the communication is happening. That is, the detection signals passed from the transmit-receive controller 94 or the device communication controller 104 may transmit simultaneously with other communication signals passed between the devices.

If, at block 144, the communication speed has not been reduced, then the host communication controller 88 reverts to the beginning of the method 140 again, with block 142. Similar to the commencement of the method 140, the host communication controller 88 may make subsequent queries about whether the communication speed has been reduced based on a timer, or some other triggering function. If, at block 144, the communication speed has been reduced to Full Speed, then the host communication controller 88 may, at block 146, lower the resistance and attempt USB Hi-Speed communication once again. The resistance may be lowered through the selection of a different resistance path as provided by the variable series termination paths 90. After the attempt at block 146 to communicate at USB Hi-Speed, the host communication controller 88 detects, at block 148, whether the communication speed has been reduced. If communication has not been reduced, then at block 150 the host device 86 and the connection device 100 continue to communicate at USB Hi-Speed. If the communication speed has been reduced, then at block 152 the host communication controller 88 detects whether a lower resistance is possible. For example, the host communication controller 88 may detect whether one of the variable series termination paths 90, or parallel combination of termination paths 90, may form a lower resistance. If a possible lower resistance is detected, then the host communication controller 88, at block 146 again, lowers the resistance and attempts USB Hi-Speed communication, repeating the inquiries in blocks 148 and 152 if necessary. If at block 152 the host communication controller 88 cannot determine that a lower resistance is possible, then at block 154 communication with the connecting device 100 will continue at USB Full Speed.

Figure 7:
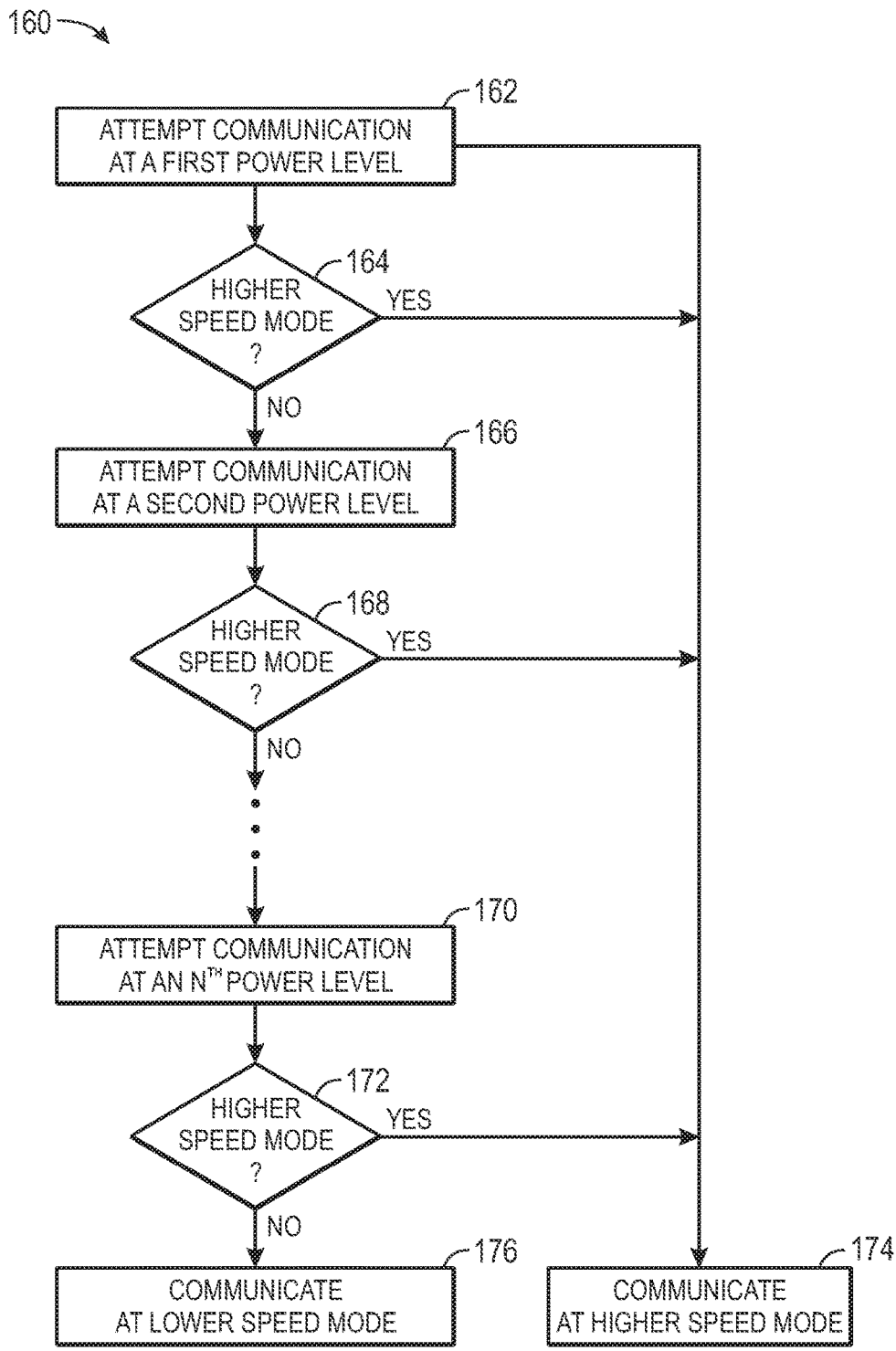
FIG. 7 is a block diagram of an electronic host device for controlling a drop in signal speed using increased signal strength and power, in accordance with an embodiment.

FIG. 7 illustrates another method that the host communication controller 56 may employ to overcome the problem of reduction in communication speed. FIG. 7 shows a method 160 that may be used to reduce or eliminate speed reduction in communication between a host device (e.g., host device 54) and a connecting device (e.g., connection device 64). The methods (i.e., 68 and 140) described above rely on a decrease in resistance to overcome the increase of resistance that may result from heat within a host device (e.g., 54, 86). The method 160 of FIG. 7 overcomes the increase in resistance by increasing the power of the communication signal between the host device 54 and the connecting device 64. As explained below, the host communication controller 56 may increase the power output without determining the precise amount that the resistance has increased due to heat within the host device 54.

As a first step of the method 160, at block 162 the host communication controller 56 attempts to communicate with the connecting device 64 at a first power level. The first power level may be selected, for example, within the host communication controller 56 by providing the transmit-receive controller 60 with a minimum level of power. In other embodiments, the first power level may be a default level that is higher than the lowest capable level at which the host device 54 may communicate. At block 164, the mode-based selection logic 62 queries whether or not the transmit-receive controller 60 was able to communicate with the connecting device 64 at a higher speed. As described above, this check may be accomplished through reception of a response from the connecting device 64. That is, the host communication controller 56 may instruct the device communication controller 66 of the connecting device 64 to respond if it is receiving a signal at a higher speed. If the device communication controller 66 does not respond, or responds in the negative, or if the host communication controller 56 detects a decrease in communication speed, then at block 166 the host communication controller 56 attempts communication a second time, increasing the power to a second power level. Increasing the power level between attempts allows the host communication controller 56 to identify a minimum power level at which the higher speed communication may take place. Beneficially, this may be done without added circuitry to detect changes in the resistance of the components in the host device 54. After the second attempt, at block 168 the host communication controller 56, through the mode-based selection logic 62, again determines whether or not the transmit-receive controller 60 was able to communicate with the connection device 64. If the communication does not occur in a higher speed mode, then the host communication controller 56 may continue to query the connection device through any number of power levels. At block 170, the host communication controller 56 attempts communication through the nth power level. In this embodiment, the nth power level represents the last and/or the highest of all the power levels possible to the host communication controller 56. In some embodiments the last and/or highest power level may be controlled by a user-designated setting or other power-saving apparatus. In other embodiment, the last power level may be the upper limit of the electronic components of the host device 54. If the nth power level does not yield a higher speed mode, at block 172, then the host communication controller 56 will communicate with the connecting device 64 at a lower speed mode.

As shown at block 164, 168 and 172 of FIG. 7, if at any step during the inquiry process the host communication controller 56 receives an affirmative answer and communicates with the connecting device 64 at the higher speed, then all subsequent communication will take place at the higher speed and the host communication controller 56 will cease communication at the lower speed mode. This also ends the method 160.

Technical effects of the present disclosure include devices and methods for overcoming a disconnect that may occur between a host device and a connecting device. The disconnect may involve a decrease in communication speed, such as when a USB host device experiences Hi-Speed disconnect. While a specific example of a USB host device is described above, other communication types may equally make use of the systems and methods described herein.

Devices are believed to experience such disconnects when heat within the device increases resistances of the components. The embodiments presented above overcome this problem by decreasing the resistance of the host device, or increasing the power used in the communication. The resistance may be reduced when the host device selects a resistance supplied by one of a number of termination paths within a host communication controller. Selection of the termination path may be done without determining how much the resistance has increased due to heat, or other circumstances. For example, the host communication controller may select one termination path and attempt communication at a higher speed. If that termination path does not work, another termination path may be selected. Additionally, the power of the communication signal may be increased in a similar manner. For example, the host communication controller may select one power level and attempt communication at a higher speed. If that power level does not work, another power level may be selected.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

What is claimed is:

1. A method of operating a first device, comprising:
    attempting to communicate between the first device and a connecting device through a first resistance;
    determining whether communication is able to occur at a higher speed mode or lower speed mode through the first resistance;
    if communication is able to occur at the higher speed mode, communicating at the higher speed mode;
    if communication is not able to occur at the higher speed mode, attempting to communicate at the higher speed mode with the connecting device through a second resistance; and
    determining whether communication is able to occur at the higher speed mode through the second resistance;
    when communication is able to occur at the higher speed mode through the second resistance, communicating at the higher speed mode through the second resistance.

2. The method of claim 1, wherein the second resistance is lower than the first resistance.

3. The method of claim 1, wherein the second resistance has a more accurate tolerance than the first resistance.

4. The method of claim 1, comprising:
    when communication is not able to occur at the higher speed mode through the second resistance, communicating at the lower speed mode;
    while communicating at the lower speed mode, attempting to communicate with the connecting device through sequentially arranged additional resistances;
    sequentially determining whether communication is possible at the higher speed mode through any of the additional resistances;
    if communication is possible at the higher speed mode through any of the additional resistances, communicating at the higher speed mode;
    if communication is not able to occur at the higher speed mode through any of the additional resistances, continuing to communicate at a lower speed mode.

5. The method of claim 4, wherein each additional resistance is lower than the previously attempted resistance.

6. The method of claim 4, wherein each additional resistance is lower than the previously attempted resistance by an amount less than 5 Ohms.

7. The method of claim 1, comprising:
when communication is not able to occur at the higher speed mode through the second resistance, communicating at the lower speed mode;
while communicating at the lower speed mode, attempting to communicate with the connecting device through sequentially increased power levels;
determining whether communication is possible at the higher speed mode through any of the power levels, if communication is possible at the higher speed mode through any of the power levels, communicating at the higher speed mode, if communication is not able to occur at the higher speed mode through any of the power levels, continuing to communicate at a lower speed mode.

8. The method of claim 7, wherein a maximum power level is determined by a user-designated setting.

9. A method of operating a device, comprising:
attempting or maintaining communication at Universal Serial Bus (U.S.B.) Hi-Speed via a first resistance of a variable series termination path;
determining whether communication has been reduced to U.S.B. Full Speed;
if communication has not been reduced to U.S.B. Full Speed, maintaining communication at U.S.B. Hi-Speed; and
if communication has been reduced to U.S.B. Full Speed, repeating the following until either communication is not reduced to U.S.B. Full Speed, or there is not a lower resistance possible:
selecting a variable series termination path with a lower resistance and attempting communication at U.S.B. Hi-Speed;
determining whether communication through the variable series termination path has been reduced to U.S.B. Full Speed; and
determining whether a lower resistance is possible through a different variable series termination path.

10. The method of claim 9, wherein each lower resistance is less than a previous resistance by a resistance amount between about 20 Ohms and about 1 Ohm.

11. A device, comprising:
a host communication controller configured to control communication between the device and a connecting device over a communication path, the host communication controller comprising:
a transmit-receive controller configured to transmit and receive communication from the connecting device;
mode-based logic configured to receive an indication of a communication mode from a plurality of communication modes of the device; and
a plurality of variable series termination paths configured to add a resistance to the communication path;
wherein the host communication controller is configured to:
select, via the mode-based logic, a first communication mode of the plurality of communication modes for the transmit-receive controller to communicate in;
attempt to communicate, via the transmit-receive controller, with the connecting device in the first communication mode using a first variable series termination path of the plurality of variable series termination paths;
if communication is not able to occur in the first communication mode using the first variable series termination path, attempting to communicate, via the transmit-receive controller, with the connecting device in the first communication mode using a second variable series termination path of the plurality of variable series termination paths; and
switch, via the mode-based logic, to a second communication mode of the plurality of communication modes for the transmit-receive controller to communicate in.

12. The device of claim 11, wherein the mode-based logic is configured to receive an indication of either a higher speed communication mode or a lower speed communication mode.

13. The device of claim 12, wherein the plurality of variable series termination paths comprise resistances that differ from one another by an amount between 20 Ohms and 1 Ohm.

14. The device of claim 11, wherein the transmit-receive controller is configured to receive a diagnostic signal from a device communication controller within the connecting device.

15. The device of claim 14, wherein the diagnostic signal is configured to enable the host communication controller to determine a speed of the communication signal.

16. The device of claim 11, comprising a Universal Serial Bus interface receptacle.

17. The device of claim 16, comprising a disconnect threshold configured to cause a disconnect wherein the device switches from communicating at Universal Serial Bus Hi-Speed to communicating at Universal Serial Bus Full Speed.

18. The device of claim 11, wherein the mode-based logic is configured to select a resistance that is lower than a resistance of a previous variable series termination path by an amount of 5 Ohms or less.

* * * * *